United States Patent
Schoenhaber et al.

(10) Patent No.: US 11,623,179 B2
(45) Date of Patent: *Apr. 11, 2023

(54) CATALYTICALLY ACTIVE PARTICULATE FILTER

(71) Applicant: UMICORE AG & CO. KG, Wolfgang (DE)

(72) Inventors: Jan Schoenhaber, Darmstadt (DE); Naina Deibel, Pfungstadt (DE); Martin Roesch, Rodgau (DE); Stephanie Spiess, Darmstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 133 days.

This patent is subject to a terminal disclaimer.

(21) Appl. No.: 16/954,299

(22) PCT Filed: Dec. 14, 2018

(86) PCT No.: PCT/EP2018/084888
§ 371 (c)(1),
(2) Date: Jun. 16, 2020

(87) PCT Pub. No.: WO2019/121367
PCT Pub. Date: Jun. 27, 2019

(65) Prior Publication Data
US 2021/0086134 A1     Mar. 25, 2021

(30) Foreign Application Priority Data

Dec. 19, 2017 (EP) .................................... 17208614

(51) Int. Cl.
*B01J 21/04* (2006.01)
*B01J 21/06* (2006.01)
(Continued)

(52) U.S. Cl.
CPC ........... *B01D 53/945* (2013.01); *F01N 3/035* (2013.01); *F01N 3/101* (2013.01);
(Continued)

(58) Field of Classification Search
CPC . B01J 21/04; B01J 21/06; B01J 21/063; B01J 21/08; B01J 21/12; B01J 23/42;
(Continued)

(56) References Cited

U.S. PATENT DOCUMENTS

| 4,335,023 A | 6/1982 | Dettling et al. |
| 6,228,799 B1 | 5/2001 | Aubert et al. |

(Continued)

FOREIGN PATENT DOCUMENTS

| CN | 1473651 A | 2/2004 |
| CN | 1935368 A | 3/2007 |

(Continued)

OTHER PUBLICATIONS

International Search Report for PCT/EP2018/084888, dated Mar. 7, 2019 (5 pgs. with English translation).

(Continued)

*Primary Examiner* — Cam N. Nguyen
(74) *Attorney, Agent, or Firm* — Smith, Gambrell & Russell, LLP

(57) ABSTRACT

The present invention relates to a particulate filter which comprises a wall-flow filter of length L and two different catalytically active coatings Y and Z, wherein the wall-flow filter comprises channels E and A that extend in parallel between a first and a second end of the wall-flow filter and are separated by porous walls which form the surfaces $O_E$ and $O_A$, respectively, and wherein the channels E are closed at the second end and the channels A are closed at the first end, and wherein the coatings Y and Z have the same oxygen storage components and the same carrier materials for noble (Continued)

metals. The invention is characterized in that the coating Y is located in the channels E on the surfaces $O_E$ and the coating Z is located in the channels A on the surfaces $O_A$.

15 Claims, 3 Drawing Sheets

(51) Int. Cl.
  *B01J 21/08* (2006.01)
  *B01J 21/12* (2006.01)
  *B01J 23/42* (2006.01)
  *B01J 23/44* (2006.01)
  *B01J 23/46* (2006.01)
  *B01J 23/63* (2006.01)
  *B01D 53/94* (2006.01)
  *F01N 3/035* (2006.01)
  *F01N 3/10* (2006.01)

(52) U.S. Cl.
  CPC .......... *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/20715* (2013.01); *B01D 2255/407* (2013.01); *B01D 2255/908* (2013.01)

(58) Field of Classification Search
  CPC .......... B01J 23/44; B01J 23/464; B01J 23/63; B01D 53/945; F01N 3/035; F01N 3/101
  USPC .................................. 502/258–527.13
  See application file for complete search history.

(56) References Cited

U.S. PATENT DOCUMENTS

| | | | |
|---|---|---|---|
| 6,294,140 B1 | 9/2001 | Mussmann et al. | |
| 6,348,430 B1 | 2/2002 | Lindner et al. | |
| 7,722,829 B2* | 5/2010 | Punke | B01J 29/068 422/180 |
| 7,871,452 B2* | 1/2011 | Yamada | B01J 37/024 422/177 |
| 7,964,527 B2 | 6/2011 | Larcher et al. | |
| 7,977,275 B2* | 7/2011 | Pfeifer | B01J 35/0006 502/178 |
| 8,007,750 B2 | 8/2011 | Chen et al. | |
| 8,012,439 B2 | 9/2011 | Arnold et al. | |
| 8,066,963 B2 | 11/2011 | Klingmann et al. | |
| 8,080,208 B2 | 12/2011 | Kim | |
| 8,119,075 B2* | 2/2012 | Dettling | F01N 3/0835 422/180 |
| 8,397,488 B2* | 3/2013 | Woerz | F01N 3/035 422/177 |
| 8,640,440 B2* | 2/2014 | Klingmann | B01D 53/945 502/328 |
| 8,663,588 B2 | 3/2014 | Lindner et al. | |
| 8,722,000 B2 | 5/2014 | Boorse | |
| 8,940,259 B2 | 1/2015 | Brown et al. | |
| 8,956,994 B2 | 2/2015 | Ifrah et al. | |
| 9,051,857 B2 | 6/2015 | Dornhaus et al. | |
| 9,156,023 B2 | 10/2015 | Klingmann et al. | |
| 9,174,198 B2 | 11/2015 | Kawabata et al. | |
| 9,238,982 B2 | 1/2016 | Springer et al. | |
| 9,266,092 B2 | 2/2016 | Arnold et al. | |
| 9,327,239 B2 | 5/2016 | Morgan | |
| 9,347,349 B2* | 5/2016 | Blakeman | B01D 53/9431 |
| 9,352,279 B2* | 5/2016 | Greenwell | B01D 53/945 |
| 9,394,816 B2* | 7/2016 | Nakayama | F01N 3/035 |
| 9,517,462 B2 | 12/2016 | Roesch et al. | |
| 9,581,063 B2 | 2/2017 | Klingmann et al. | |
| 9,789,443 B2* | 10/2017 | Greenwell | B01J 35/10 |
| 10,071,342 B2* | 9/2018 | Schoenhaber | B01D 53/94 |
| 10,071,368 B2* | 9/2018 | Onoe | B01J 37/02 |
| 10,076,725 B2* | 9/2018 | Onoe | F01N 3/035 |
| 10,125,649 B2 | 11/2018 | Onoe et al. | |
| 10,159,934 B2 | 12/2018 | Kitamura et al. | |
| 10,201,805 B2* | 2/2019 | Ohashi | F01N 3/022 |
| 10,344,655 B2* | 7/2019 | Onoe | F01N 3/035 |
| 10,357,744 B2* | 7/2019 | Ohashi | B01D 53/9472 |
| 10,413,886 B2 | 9/2019 | Despres et al. | |
| 10,618,034 B2 | 4/2020 | Kasuya et al. | |
| 10,814,311 B2 | 10/2020 | Hoshino et al. | |
| 10,933,373 B2* | 3/2021 | Deibel | F01N 3/101 |
| 11,097,260 B2 | 8/2021 | Kurihara et al. | |
| 11,179,676 B2* | 11/2021 | Schoenhaber | B01J 23/63 |
| 11,185,820 B2 | 11/2021 | Schoenhaber et al. | |
| 11,187,129 B2 | 11/2021 | Nomura et al. | |
| 11,208,931 B2 | 12/2021 | Kurihara et al. | |
| 11,266,982 B2 | 3/2022 | Kurihara et al. | |
| 11,291,952 B2 | 4/2022 | Schoenhaber et al. | |
| 11,400,414 B2* | 8/2022 | Deibel | F01N 3/101 |
| 2004/0065078 A1 | 4/2004 | Schafer-Sindlinger et al. | |
| 2006/0057046 A1 | 3/2006 | Punke et al. | |
| 2006/0142151 A1 | 6/2006 | Taki et al. | |
| 2007/0093381 A1 | 4/2007 | Miyoshi et al. | |
| 2008/0090723 A1 | 4/2008 | Okamoto et al. | |
| 2009/0193796 A1 | 8/2009 | Wei et al. | |
| 2010/0055012 A1 | 3/2010 | Grisstede et al. | |
| 2010/0275579 A1 | 11/2010 | Klingmann et al. | |
| 2010/0319332 A1 | 12/2010 | Jeske et al. | |
| 2011/0030346 A1 | 2/2011 | Neubauer et al. | |
| 2011/0094207 A1 | 4/2011 | Woerz et al. | |
| 2011/0179777 A1 | 7/2011 | Chandler et al. | |
| 2011/0252773 A1 | 10/2011 | Arnold et al. | |
| 2012/0304623 A1 | 12/2012 | Springer et al. | |
| 2013/0143732 A1 | 6/2013 | Aoki | |
| 2014/0234189 A1 | 8/2014 | Clowes et al. | |
| 2014/0140899 A1 | 11/2014 | Gabrielsson et al. | |
| 2017/0296969 A1* | 10/2017 | Ohashi | F01N 3/28 |
| 2017/0304773 A1* | 10/2017 | Onoe | B01J 37/0244 |
| 2017/0368536 A1 | 12/2017 | Despres et al. | |
| 2018/0021767 A1 | 1/2018 | Onoe et al. | |
| 2018/0119589 A1* | 5/2018 | Chandler | B01D 53/9472 |
| 2018/0178198 A1 | 6/2018 | Deeba et al. | |
| 2019/0120104 A1 | 4/2019 | Inoda et al. | |
| 2020/0094189 A1 | 3/2020 | Deibel et al. | |
| 2020/0188887 A1 | 6/2020 | Kobayashi et al. | |
| 2020/0306693 A1 | 10/2020 | Schoenhaber et al. | |
| 2020/0316565 A1 | 10/2020 | Fisher et al. | |
| 2020/0362738 A1 | 11/2020 | Schoenhaber et al. | |
| 2021/0069678 A1 | 3/2021 | Schoenhaber et al. | |
| 2021/0079822 A1 | 3/2021 | Schoenhaber et al. | |
| 2021/0086134 A1 | 3/2021 | Schoenhaber et al. | |
| 2021/0086135 A1 | 3/2021 | Schoenhaber et al. | |
| 2021/0236976 A1 | 8/2021 | Foerster et al. | |
| 2021/0396167 A1* | 12/2021 | Foerster | B01D 46/2474 |
| 2022/0176355 A1 | 6/2022 | Kucerova et al. | |

FOREIGN PATENT DOCUMENTS

| | | |
|---|---|---|
| CN | 100427205 C | 10/2008 |
| CN | 101553304 A | 10/2009 |
| CN | 101626832 A | 1/2010 |
| CN | 102049191 A | 5/2011 |
| CN | 102196853 A | 9/2011 |
| CN | 102574056 A | 7/2012 |
| CN | 102808677 A | 12/2012 |
| CN | 102939445 A | 2/2013 |
| CN | 103127927 A | 6/2013 |
| CN | 104254387 A | 12/2014 |
| CN | 104271237 A | 1/2015 |
| CN | 104661730 A | 5/2015 |
| CN | 104785257 A | 7/2015 |
| CN | 104838099 A | 8/2015 |
| CN | 105008025 A | 10/2015 |
| CN | 105228730 A | 1/2016 |
| CN | 105793529 A | 7/2016 |
| CN | 105964253 A | 9/2016 |
| CN | 108295851 A | 7/2018 |
| DE | 10 2011 050 788 A1 | 12/2012 |
| DE | 10 2013 207 415 A1 | 10/2013 |
| DE | 20 2010 018 081 U1 | 2/2014 |

(56) References Cited

FOREIGN PATENT DOCUMENTS

| | | |
|---|---|---|
| DE | 102014104748 A1 | 10/2014 |
| DE | 11 2013 002 163 T5 | 1/2015 |
| DE | 10 2005 005 663 A1 | 8/2016 |
| DE | 10 2015 212 788 A1 | 1/2017 |
| DE | 10 2018 111 246 A1 | 11/2019 |
| EP | 0 885 650 A2 | 12/1998 |
| EP | 1 046 423 A2 | 10/2000 |
| EP | 1 657 410 A2 | 5/2006 |
| EP | 1 726 359 A1 | 11/2006 |
| EP | 1 974 810 A1 | 10/2008 |
| EP | 2 042 225 A1 | 4/2009 |
| EP | 2 042 226 A2 | 4/2009 |
| EP | 1 974 809 A1 | 9/2010 |
| EP | 2 322 773 A1 | 5/2011 |
| EP | 2 650 042 A1 | 10/2013 |
| EP | 1 541 220 B1 | 2/2014 |
| EP | 2 948 653 A1 | 12/2015 |
| EP | 3 045 226 A1 | 7/2016 |
| EP | 3 162 428 A1 | 5/2017 |
| EP | 3 205 388 A1 | 8/2017 |
| EP | 3 207 977 A1 | 8/2017 |
| EP | 3 207 978 A1 | 8/2017 |
| EP | 3 207 987 A1 | 8/2017 |
| EP | 3 207 989 A1 | 8/2017 |
| EP | 3 207 990 A1 | 8/2017 |
| EP | 3 247 493 A1 | 11/2017 |
| EP | 3 254 757 A1 | 12/2017 |
| EP | 3 257 571 A1 | 12/2017 |
| EP | 3 406 322 A1 | 11/2018 |
| FR | 3 020 091 A1 | 10/2015 |
| JP | 6487982 B1 | 4/1989 |
| JP | 2014-117680 A | 6/2014 |
| JP | 2016-203116 A | 12/2016 |
| JP | 6487982 B1 | 3/2019 |
| WO | 95/35152 A1 | 12/1995 |
| WO | 2008/000449 A2 | 1/2008 |
| WO | 2009/100097 A2 | 8/2009 |
| WO | 2011/015615 A1 | 2/2011 |
| WO | 2013/160678 A2 | 10/2013 |
| WO | 2014/125296 A1 | 8/2014 |
| WO | 2014/178633 A1 | 11/2014 |
| WO | 2015/082892 A2 | 6/2015 |
| WO | 2016/133085 A1 | 8/2016 |
| WO | 2016/133086 A1 | 8/2016 |
| WO | 2017/034920 A1 | 3/2017 |
| WO | 2017/109514 A1 | 6/2017 |
| WO | 2017/126631 A1 | 7/2017 |
| WO | 2017/209083 A1 | 12/2017 |
| WO | 2018/056246 A1 | 3/2018 |

OTHER PUBLICATIONS

Written Opinion of the International Searching Authority for PCT/EP2018/084888, dated Mar. 7, 2019 (9 pgs.).
Von Johann Siebler, et al. MTZ Motortechnische Zeitschrift "Katalysatorprüfung" 1994, 55, pp. 214-218.
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).
International Preliminary Report on Patentability dated Jun. 23, 2020 for International Patent Application No. PCT/EP2018/084888 (10 pages in German with English translation).
European Search Report dated May 28, 2018 for European Application No. 17208614.2 (10 pages).
Wikipedia. Color difference. Accessed Jul. 5, 2018 https://en.wikipedia.org/wiki/Color difference#CIE76 (6 pages).
Wikipedia. Partikelgrößenverteilung (Particle Size Distribution). https://de.wikipedia.org/wiki/Partikelgr%C3%B6%C3%9Fenverteilung (14 pgs. with English Translation) Accessed Jun. 16, 2020.
Notice of Allowance and Fees Due dated Jul. 22, 2022 in U.S. Appl. No. 16/954,305 (5 pages).
Non Final Office Action dated Jun. 18, 2022 in U.S. Appl. No. 16/954,305 (8 pages).
Non Final Office Action dated Aug. 19, 2022 in U.S. Appl. No. 16/954,323 (9 pages).
Final Office Action dated Apr. 11, 2022 in U.S. Appl. No. 16/954,323 (26 pages).
Advisory Action dated Jan. 25, 2022 U.S. Appl. No. 16/954,323 (pages).
Final Office Action dated Nov. 23, 2021 in U.S. Appl. No. 16/954,323 (24 pages).
Non Final Office Action dated May 28, 2021 in U.S. Appl. No. 16/954,323 (24 pages).
Notice of Allowance and Fees Due dated Jul. 26, 2022 in U.S. Appl. No. 16/954,612 (8 pages).
Non Final Office Action dated Apr. 11, 2022 in U.S. Appl. No. 16/954,612 (9 pages).
Notice of Allowance and Fees Due dated Aug. 2, 2021 in U.S. Appl. No. 16/954,628 (5 pages).
Non Final Office Action dated Jun. 21, 2021 in U.S. Appl. No. 16/954,628 (7 pages).
Notice of Allowance and Fees Due dated Dec. 1, 2021 in U.S. Appl. No. 16/954,637 (5 pages).
Non Final Office Action dated Aug. 17, 2021 in U.S. Appl. No. 16/954,637 (8 pages).
English Translation of Chinese First Office Action dated Sep. 30, 2022 for CN 201880082178.1 (7 pages).
Chinese Search Report dated Dec. 17, 2021 for CN 201880082071.7 (2 pages).
Chinese First Office Action dated Dec. 23, 2021 for CN 201880082071.7 (7 pages in Chinese with English Translation).
Chinese Second Office Action dated Jun. 24, 2022 for CN 201880082071.7 (9 pages in Chinese with English Translation).
Supplemental Chinese Search Report dated Jun. 15, 2022 for CN201880082071.7 (2 pages).
Chinese Search Report dated Dec. 30, 2021 for CN 201880081450.4 (1 page).
Chinese First Office Action dated Jun. 1, 2022 for CN 201880081450.4 (5 pages in Chinese with English Translation).
Chinese Second Office Action dated Jun. 22, 2022 for CN 201880081450.4 (5 pages in Chinese with English Translation).
Chinese Search Report dated Dec. 30, 2022 for CN 201880081997.4 (1 page).
Chinese First Office Action dated Jan. 6, 2022 for CN 201880081997.4 (6 pages in Chinese with English Translation).
Chinese Second Office Action dated Jul. 28, 2022 for CN 201880081997.4 (6 pages in Chinese with English Translation).
English Translation of Chinese First Office Action dated Aug. 10, 2022 for CN 201880081996.X (9 pages).
Chinese Office Action dated Oct. 25, 2022 for Chinese Patent Application No. 201880082229.0 (5 pages in Chinese with English translation).

* cited by examiner

CATALYTICALLY ACTIVE PARTICULATE FILTER

The present invention relates to a catalytically active particulate filter that is particularly suitable for the removal of particles, carbon monoxide, hydrocarbons and nitrogen oxides from the exhaust gas of combustion engines fueled by a stoichiometric air-fuel mixture.

Exhaust gases from combustion engines, i.e. gasoline engines, fueled by stoichiometric air-fuel mixtures are cleaned in conventional methods with the aid of three-way catalytic converters. Such catalytic converters are capable of simultaneously converting the three major gaseous pollutants of the engine, namely hydrocarbons, carbon monoxide and nitrogen oxides, into harmless components.

In addition to such gaseous pollutants, the exhaust gas from gasoline engines also contains extremely fine particles (PM), which arise from the incomplete combustion of the fuel and substantially consist of soot. In contrast to the particle emission of diesel engines, the particles in the exhaust gas of stoichiometrically operated combustion engines are very small and have an average particle size of less than 1 µm. Typical particle sizes range from 10 to 200 nm. Furthermore, the amount of particles emitted is very low and ranges from 2 to 4 mg/km.

The European exhaust emission standard EU-6c is associated with a conversion of the limit value for such particles from the particle mass limit value to a more critical particle number limit value of $6 \times 10^{11}$/km (in the Worldwide Harmonized Light Vehicles Test Cycle—WLTP). This creates a need for exhaust gas cleaning concepts for stoichiometrically operated combustion engines, which include effectively operating equipment for removing particles.

Wall-flow filters made of ceramic materials, such as silicon carbide, aluminum titanate and cordierite, have proven themselves in the field of cleaning exhaust gases from lean-burn engines, i.e. in particular diesel engines. These are made up of a plurality of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. The exhaust gas flowing into the channels A, for example, may leave the filter again only via the channels B and must, for this purpose, flow through the porous walls between the channels A and B. When the exhaust gas passes through the wall, the particles are retained and the exhaust gas is cleaned.

The particles retained in this manner must then be burnt off or oxidized in order to prevent a clogging of the filter or an unacceptable increase in the back pressure of the exhaust system. For this purpose, the wall-flow filter is, for example, provided with catalytically active coatings that reduce the ignition temperature of soot.

Applying such coatings to the porous walls between the channels (so-called "on-wall coating") or introducing them into the porous walls (so-called "in-wall coating") is already known. EP 1 657 410 A2 also already describes a combination of both coating types; that is, part of the catalytically active material is present in the porous walls and another part is present on the porous walls.

The concept of removing particles from the exhaust gas using wall-flow filters has already been applied to the cleaning of exhaust gas from combustion engines fueled by stoichiometric air-fuel mixtures; see, for example, EP 2042226 A2. According to its teaching, a wall-flow filter comprises two layers arranged one above the other, wherein one can be arranged in the porous wall and the other can be arranged on the porous wall.

DE 102011050788 A1 pursues a similar concept. There, the porous filter walls contain a catalyst material of a three-way catalytic converter, while in addition a catalyst material of a three-way catalytic converter is applied to sections of the filter walls.

Further documents describing filter substrates provided with catalytically active coatings are EP 3205388 A1, EP 3207977 A1, EP 3207978 A1, EP 3207987 A1, EP 3207989 A1, EP 3207990 A1 and EP 3162428 A1.

There is still a need for catalytically active particulate filters that combine the functionalities of a particulate filter and a three-way catalytic converter and at the same time adhere to the limits that will apply in the future.

Figure 1:
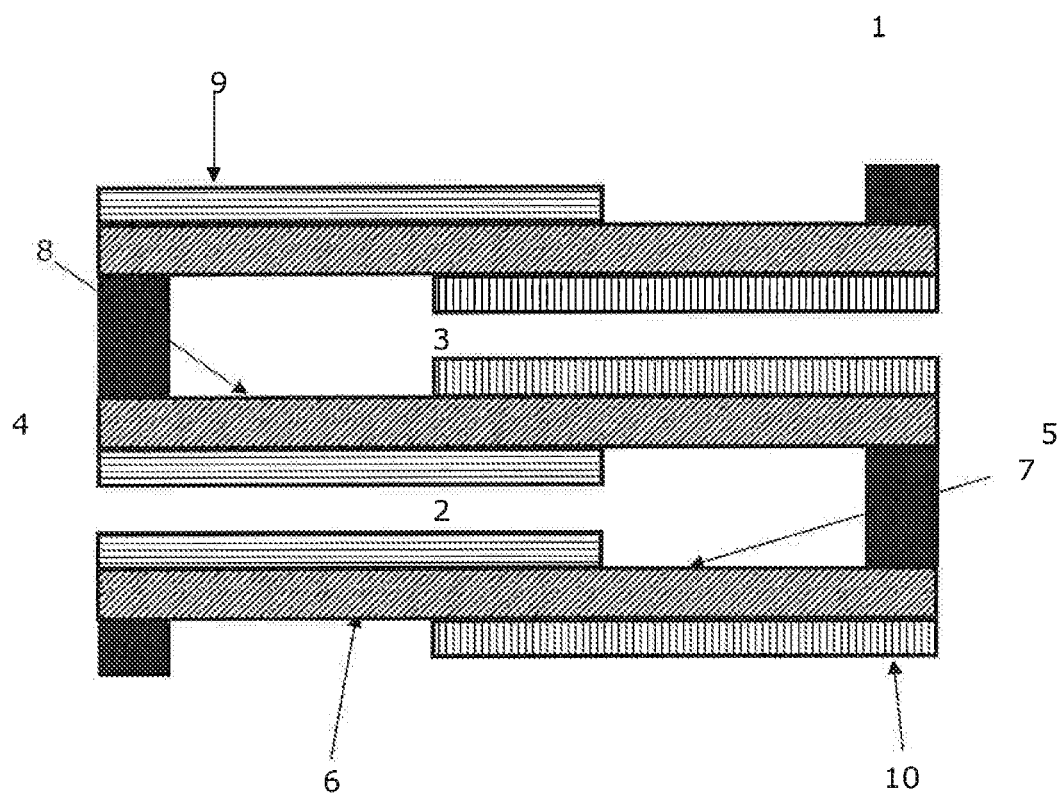
FIG. 1 shows a particulate filter according to the invention.

The present invention relates to a particulate filter for removing particles, carbon monoxide, hydrocarbons and nitrogen oxides from the exhaust gas of combustion engines fueled by stoichiometric air-fuel mixtures, which filter comprises a wall-flow filter of length L and two coatings Y and Z, wherein the wall-flow filter comprises channels E and A that extend in parallel between a first and a second end of the wall-flow filter and are separated by porous walls which form surfaces $O_E$ and $O_A$, respectively, and wherein the channels E are closed at the second end and the channels A are closed at the first end, and wherein the coatings Y and Z have the same oxygen storage components and the same carrier materials for noble metals, characterized in that coating Y is located in the channels E on the surfaces $O_E$ and extends from the first end of the wall-flow filter over a length of 51 to 90% of the length L, and coating Z is located in the channels A on the surfaces $O_A$ and extends from the second end of the wall-flow filter over a length of 51 to 90% of the length L.

The coatings Y and Z are three-way catalytically active, especially at operating temperatures of 250 to 1100° C. They usually contain one or more noble metals fixed to one or more carrier materials, and one or more oxygen storage components.

The coatings Y and Z comprise the same oxygen storage components and the same carrier materials for noble metals in different but preferably in equal quantities. The coatings Y and Z also contain the same or different noble metals in the same or different quantities.

Platinum, palladium and rhodium are particularly suitable as noble metals, wherein palladium, rhodium or palladium and rhodium are preferred and palladium and rhodium are particularly preferred.

Based on the particulate filter according to the invention, the proportion of rhodium in the entire noble metal content is in particular greater than or equal to 10% by weight. In a preferred embodiment, 50-100% of the total rhodium proportion is located in the layer Y and 50-100% of the total palladium proportion in the layer Z. In a particularly preferred embodiment, 75-100% of the total rhodium proportion is located in the layer Y and 75-100% of the total palladium section in the layer Z.

The porous walls of the particulate filter according to the invention are preferably free of noble metals. In the context of the invention, it may happen that some washcoat of the layers Y and Z penetrates into the surface pores of the wall-flow filter during coating. According to the invention, however, this should be avoided as much as possible. Generally, the amount of washcoat which penetrates into the surface regions of the porous filter wall is <20%, more preferably <10% and most preferably <5%, based on the weight of washcoat used.

Since these are on-wall coatings in the present case, they have a certain elevation over the wall surface. However, the thickness of the two layers is generally between 5-250 μm, preferably 7.5-225 μm and very preferably between 10-200 μm, wherein the thickness of the layer preferably is determined in the middle of a respective channel and not in the corners. Standard analytical methods known to the person skilled in the art, such as scanning electron microscopy, are suitable for determining the layer thickness.

The noble metals are usually used in quantities of 0.15 to 5 g/l based on the volume of the wall-flow filter.

As carrier materials for the noble metals, all materials familiar to the person skilled in the art can be considered for this purpose. Such materials are in particular metal oxides with a BET surface area of 30 to 250 m$^2$/g, preferably 100 to 200 m$^2$/g (determined according to DIN 66132—most recent version on application date).

Particularly suitable carrier materials for the noble metals are selected from the series consisting of aluminum oxide, doped aluminum oxide, silicon oxide, titanium dioxide and mixed oxides of one or more of these. Doped aluminum oxides are, for example, aluminum oxides doped with lanthanum oxide, zirconium oxide and/or titanium oxide. Lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide.

Another suitable carrier material is lanthanum-stabilized aluminum oxide the surface of which is coated with lanthanum oxide, with barium oxide or with strontium oxide.

Cerium/zirconium/rare earth metal mixed oxides are particularly suitable as oxygen storage components. The term "cerium/zirconium/rare earth metal mixed oxide" within the meaning of the present invention excludes physical mixtures of cerium oxide, zirconium oxide and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products may arise which can generally be used without any disadvantage.

In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium/zirconium/rare earth metal mixed oxides.

Lanthanum oxide, yttrium oxide and/or praseodymium oxide are preferred. Lanthanum oxide and/or yttrium oxide are particularly preferred, and lanthanum oxide and yttrium oxide, yttrium oxide and praseodymium oxide, and lanthanum oxide and praseodymium oxide are more particularly preferred.

In embodiments of the present invention, the oxygen storage components are free of neodymium oxide.

In accordance with the invention, the mass ratio of cerium oxide to zirconium oxide in the cerium/zirconium/rare earth metal mixed oxides can vary within wide limits. It amounts to, for example, 0.1 to 1.5, preferably 0.2 to 1 or 0.3 to 0.5.

If the cerium/zirconium/rare earth metal mixed oxides contain yttrium oxide as a rare earth metal, the proportion thereof is in particular 5 to 15% by weight.

If the cerium/zirconium/rare earth metal mixed oxides contain praseodymium oxide as a rare earth metal, the proportion thereof is in particular 2 to 10% by weight.

If the cerium/zirconium/rare earth metal mixed oxides contain lanthanum oxide and yttrium oxide as a rare earth metal, its mass ratio is in particular 0.1 to 1, preferably 0.125-0.75 and very preferably 0.15-0.5.

If the cerium/zirconium/rare earth metal mixed oxides contain lanthanum oxide and praseodymium oxide as a rare earth metal, its mass ratio is in particular 0.1 to 2, preferably 0.125-1.7 and very preferably 0.15-1.5.

The coatings Y and Z usually contain oxygen storage components in quantities from 15 to 120 g/l based on the volume of the wall-flow filter.

The mass ratio of carrier materials and oxygen storage components in the coatings Y and Z is usually 0.3 to 1.5, for example 0.4 to 1.3.

In the embodiments of the present invention, one or both of the coatings Y and Z contain an alkaline earth compound, such as strontium oxide, barium oxide or barium sulfate. The quantity of barium sulfate per coating is in particular 2 to 20 g/l volume of the wall-flow filter.

In further embodiments of the present invention, one or both of the coatings Y and Z contain additives, such as rare earth compounds, such as lanthanum oxide, and/or binders, such as aluminum compounds. These additives are used in quantities that may vary widely and which the person skilled in the art may determine in a specific case by simple means.

In embodiments of the present invention, the coatings Y and Z comprise lanthanum-stabilized aluminum oxide, rhodium, palladium or palladium and rhodium and an oxygen storage component comprising zirconium oxide, cerium oxide, yttrium oxide and lanthanum oxide.

In other embodiments of the present invention, the coatings Y and Z comprise lanthanum-stabilized aluminum oxide, rhodium, palladium or palladium and rhodium and an oxygen storage component comprising zirconium oxide, cerium oxide, praseodymium oxide and lanthanum oxide.

In other embodiments of the present invention, the coatings Y and Z comprise lanthanum-stabilized aluminum oxide, rhodium, palladium or palladium and rhodium, a first oxygen storage component comprising zirconium oxide, cerium oxide, yttrium oxide and lanthanum oxide, and a second oxygen storage component comprising zirconium oxide, cerium oxide, yttrium oxide and praseodymium oxide.

In embodiments, the coatings Y and Z each comprise lanthanum-stabilized aluminum oxide in quantities from 20 to 70% by weight, particularly preferably 25 to 60% by weight, and the oxygen storage component in quantities from 30 to 80% by weight, particularly preferably 40 to 70% by weight, in each case based on the total weight of the coating Y or Z.

In embodiments of the present invention, the coating Y extends from the first end of the wall-flow filter over 55 to 90%, in particular 57 to 85%, of the length L of the wall-flow filter. In a particularly preferred embodiment, the coating Y extends from the first end of the wall-flow filter over 57 to 65% of the length L of the wall-flow filter. The load of the wall-flow filter with coating Y preferably amounts to 33 to 125 g/l based on the volume of the wall-flow filter.

In embodiments of the present invention, the coating Z extends from the second end of the wall-flow filter over 55 to 90%, in particular 57 to 85%, of the length L of the wall-flow filter. In a particularly preferred embodiment of the present invention, the coating Z extends from the first end of the wall-flow filter over 57 to 65% of the length L of the wall-flow filter. The load of the wall-flow filter with coating Z preferably amounts to 33 to 125 g/l based on the volume of the wall-flow filter.

In embodiments of the present invention, the sum of the lengths of coating Y and coating Z is 110 to 180% of the length L, preferably 114 to 170% of the length L, and particularly preferably 120 to 130% of the length L.

In embodiments of the present invention, the coatings Y and Z contain no zeolite and no molecular sieve.

The total load of the particulate filter according to the invention with the coatings Y and Z amounts in particular to 40 to 150 g/l based on the volume of the wall-flow filter.

In one embodiment of the present invention, the present invention relates to a particulate filter which comprises a wall-flow filter of length L and two coatings Y and Z, wherein the wall-flow filter comprises channels E and A that extend in parallel between a first and a second end of the wall-flow filter and are separated by porous walls which form the surfaces $O_E$ and $O_A$, respectively, and wherein the channels E are closed at the second end and the channels A are closed at the first end, and wherein the coatings Y and Z comprise the same oxygen storage components and the same carrier materials for noble metals, characterized in that coating Y is located in the channels E on the surfaces $O_E$ and extends from the first end of the wall-flow filter over 57 to 65% of the length L,
coating Z is located in the channels A on the surfaces $O_A$ and extends from the second end of the wall-flow filter over 57 to 65% of the length L,
and the coatings Y and Z contains aluminum oxide in a quantity from 20 to 70% by weight based on the total weight of the coating Y or Z, rhodium, palladium or palladium and rhodium and an oxygen storage component in a quantity from 30 to 80% by weight based on the total weight of the coating Y or Z, wherein
the oxygen storage component comprises zirconium oxide, cerium oxide, lanthanum oxide and yttrium oxide or zirconium oxide, cerium oxide, lanthanum oxide and praseodymium oxide or a mixture of two oxygen storage components, wherein one oxygen storage component contains zirconium oxide, cerium oxide, lanthanum oxide and yttrium oxide and the other contains zirconium oxide, cerium oxide, lanthanum oxide and praseodymium oxide.

Wall-flow filters that can be used in accordance with the present invention are well-known and available on the market. They consist of, for example, silicon carbide, aluminum titanate or cordierite, and have, for example, a cell density of 200 to 400 cells per inch and usually a wall thickness between 6 and 12 mil, or 0.1524 and 0.305 millimeters.

In the uncoated state, they have porosities of 50 to 80, in particular 55 to 75%, for example. In the uncoated state, their average pore size is 10 to 25 micrometers, for example. Generally, the pores of the wall-flow filter are so-called open pores, that is, they have a connection to the channels. Furthermore, the pores are normally interconnected with one another. This enables, on the one hand, the easy coating of the inner pore surfaces and, on the other hand, the easy passage of the exhaust gas through the porous walls of the wall-flow filter.

The particulate filter in accordance with the invention can be produced according to methods known to the person skilled in the art, for example by applying a coating suspension, which is usually called a washcoat, to the wall-flow filter by means of one of the usual dip coating methods or pump and suction coating methods. Thermal post-treatment or calcination usually follow.

The coatings Y and Z are obtained in separate and successive coating steps.

The person skilled in the art knows that the average pore size of the wall-flow filter and the average particle size of the catalytically active materials must be matched to each other in order to achieve an on-wall coating or an in-wall coating. In the case of an in-wall coating, the average particle size of the catalytically active materials must be small enough to penetrate the pores of the wall-flow filter. In contrast, in the case of an on-wall coating, the average particle size of the catalytically active materials must be large enough not to penetrate the pores of the wall-flow filter.

In embodiments of the present invention, the coating suspensions for the production of the coatings Y and Z are ground to a particle size distribution of $d_{50}$=4 to 8 μm and $d_{99}$=22 to 16 μm.

The particulate filter according to the invention is outstandingly suitable for removing particles, carbon monoxide, hydrocarbons and nitrogen oxides from the exhaust gas of combustion engines fueled by a stoichiometric air-fuel mixture.

The present invention thus also relates to a method for removing particles, carbon monoxide, hydrocarbons and nitrogen oxides from the exhaust gas of combustion engines fueled by a stoichiometric air-fuel mixture, which method is characterized in that the exhaust gas is conducted over a particulate filter according to the invention.

In this case, the exhaust gas can be conducted over a particulate filter according to the invention in such a way that it enters the particulate filter through the channels E and leaves it again through the channels A.

However, it is also possible for the exhaust gas to enter the particulate filter through the channels A and to leave it again through the channels E.

FIG. 1 shows a particulate filter according to the invention which comprises a wall-flow filter of length L (1) with channels E (2) and channels A (3) that extend in parallel between a first end (4) and a second end (5) of the wall-flow filter and are separated by porous walls (6) which form the surfaces $O_E$ (7) and $O_A$ (8), respectively, and wherein the channels E (2) are closed at the second end (5) and the channels A (3) are closed at the first end (4). Coating Y (9) is located in the channels E (2) on the surfaces $O_E$ (7) and coating Z (10) is located in the channels A (3) on the surfaces $O_A$ (8).

The invention is explained in more detail in the following examples.

COMPARATIVE EXAMPLE 1

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat a commercially available wall-flow filter substrate, wherein the coating was introduced into the porous filter wall over 100% of the substrate length. The total load of this filter amounted to 75 g/l; the total noble metal load amounted to 1.27 g/l with a ratio of palladium to rhodium of 5:1. The coated filter thus obtained was dried and then calcined. It is hereinafter referred to as VGPF1.

EXAMPLE 1

Coating the Input and Output Channels:

Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate, first in the input channels to a length of 60% of the filter length. The load of the inlet channel amounted to 62.5 g/l; the noble metal load amounted to 1.06 g/l with a ratio of palladium to rhodium of 5:1. The coated filter thus obtained was dried and then calcined. Then, the output channels of the filter were coated to a length of 60% of the filter length with the same coating suspension. The coated filter thus obtained was dried again and then calcined. The total load of this filter thus amounted to 75 g/l; the total noble metal load amounted to 1.27 g/l with a ratio of palladium to rhodium of 5:1. It is hereinafter referred to as GPF1.

EXAMPLE 2

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate, first in the input channels to a length of 60% of the filter length. The load of the inlet channel amounted to 62.5 g/l; the noble metal load amounted to 1.06 g/l with a ratio of palladium to rhodium of 5:1. The coated filter thus obtained was dried and then calcined. Then, the output channels of the filter were coated to a length of 60% of the filter length with the same coating suspension. The coated filter thus obtained was dried again and then calcined. The total load of this filter thus amounted to 75 g/l; the total noble metal load amounted to 1.27 g/l with a ratio of palladium to rhodium of 5:1. It is hereinafter referred to as GPF2.

Catalytic Characterization

The particulate filters VGPF1, GPF1 and GPF2 were aged together in an engine test bench aging process. This aging process consists of an overrun cut-off aging process with an exhaust gas temperature of 950° C. before the catalyst input (maximum bed temperature of 1030° C.). The aging time was 19 hours (see Motortechnische Zeitschrift, 1994, 55, 214-218).

The catalytically active particulate filters were then tested in the aged state at an engine test bench in the so-called "light-off test" and in the "lambda sweep test." In the light-off test, the light-off behavior is determined in the case of a stoichiometric exhaust gas composition with a constant average air ratio $\lambda$ ($\lambda$=0.999 with ±3.4% amplitude).

Table 1 below contains the temperatures $T_{50}$ at which 50% of the considered components are respectively converted.

TABLE 1

| | $T_{50}$ HC stoichiometric | $T_{50}$ CO stoichiometric | $T_{50}$ NOx stoichiometric |
|---|---|---|---|
| VGPF1 | 376 | 384 | 398 |
| GPF1 | 340 | 342 | 340 |
| GPF2 | 376 | 384 | 390 |

The dynamic conversion behavior of the particulate filters was determined in a lambda sweep test in a range from $\lambda$=0.99-1.01 at a constant temperature of 510° C. The amplitude of $\lambda$ in this case amounted to ±3.4%. Table 2 shows the conversion at the intersection of the CO and NOx conversion curves, along with the associated HC conversion of the aged particulate filters.

TABLE 2

| | CO/NOx conversion at the point of intersection | HC conversion at $\lambda$ of the CO/NOx point of intersection |
|---|---|---|
| VGPF1 | 83% | 96% |
| GPF1 | 96% | 97% |
| GPF2 | 90% | 97% |

The particulate filters GPF1 and GPF2 according to the invention show a marked improvement in light-off behavior and dynamic CO/NOx conversion in the aged state compared with VGPF1.

COMPARATIVE EXAMPLE 2 a) Application of the in-Wall Coating:

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat a commercially available wall-flow filter substrate, wherein the coating was introduced into the porous filter wall over 100% of the substrate length. The total load of this filter amounted to 100 g/l; the noble metal load amounted to 2.60 g/l with a ratio of palladium to rhodium of 60:13.75. The coated filter thus obtained was dried and then calcined, b) Coating the Input Channels Aluminum oxide stabilized with lanthanum oxide was suspended in water with an oxygen storage component, which comprised 40% by weight cerium oxide, zirconium oxide, lanthanum oxide and praseodymium oxide. The weight ratio of aluminum oxide and oxygen storage component was 50:50. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the input channels to a length of 25% of the filter length. The load of the input channel amounted to 58 g/l; the noble metal load amounted to 2.30 g/l with a ratio of palladium to rhodium of 10:3. The coated filter thus obtained was dried and then calcined.

c) Coating the Output Channels

Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat the wall-flow filter substrate obtained under b), wherein the filter walls of the substrate were coated in the output channels to a length of 25% of the filter length. The load of the outlet channel amounted to 59 g/l; the noble metal load amounted to 1.06 g/l with a ratio of palladium to rhodium of 1:2. The coated filter thus obtained was dried and then calcined. The total load of this filter thus amounted to 130 g/l; the total noble metal load amounted to 3.44 g/l with a ratio of palladium to rhodium of 10:3. It is hereinafter referred to as VGPF2.

COMPARATIVE EXAMPLE 3 a) Application of the in-Wall Coating:

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat a commercially available wall-flow filter substrate, wherein the coating was introduced into the porous filter wall over 100% of the substrate length. The load of this filter amounted to 100 g/l; the noble metal load amounted to 2.07 g/l with a ratio of palladium to rhodium of 45:13.5. The coated filter thus obtained was dried and then calcined.

b) Coating the Input Channels

Aluminum oxide stabilized with lanthanum oxide was suspended in water with an oxygen storage component, which comprised 40% by weight cerium oxide, zirconium oxide, lanthanum oxide and praseodymium oxide. The weight ratio of aluminum oxide and oxygen storage component was 50:50. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the input channels to a length of 60% of the filter length. The load of the input channel amounted to 90 g/l; the noble metal load amounted to 2.30 g/l with a ratio of palladium to rhodium of 10:3. The coated filter thus obtained was dried and then calcined. The total load of this filter thus amounted to 154 g/l; the total noble metal load amounted to 3.44 g/l with a ratio of palladium to rhodium of 10:3. It is hereinafter referred to as VGPF3.

EXAMPLE 3

Coating the Input Channels a) Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate in the input channels to a length of 60% of the filter length. The load of the inlet channel amounted to 83.33 g/l; the noble metal load amounted to 2.87 g/l with a ratio of palladium to rhodium of 10:3. The coated filter thus obtained was dried and then calcined. Then, the output channels of the filter were coated to a length of 60% of the filter length with the same coating suspension. The coated filter thus obtained was dried again and then calcined. The total load of this filter thus amounted to 100 g/l; the total noble metal load amounted to 3.44 g/l with a ratio of palladium to rhodium of 10:3. It is hereinafter referred to as GPF3.

Catalytic Characterization

The particulate filters VGPF2, VGF3 and GPF3 were aged together in an engine test bench aging process. This aging process consists of an overrun cut-off aging process with an exhaust gas temperature of 950° C. before the catalyst input (maximum bed temperature of 1030° C.). The aging time was 76 hours (see Motortechnische Zeitschrift, 1994, 55, 214-218).

The catalytically active particulate filters were then tested in the aged state at an engine test bench in the so-called "light-off test" and in the "lambda sweep test." In the light-off test, the light-off behavior is determined in the case of a stoichiometric exhaust gas composition with a constant average air ratio $\lambda$ ($\lambda$=0.999 with ±3.4% amplitude).

Table 3 below contains the temperatures $T_{50}$ at which 50% of the considered components are respectively converted.

TABLE 3

| | $T_{50}$ HC stoichiometric | $T_{50}$ CO stoichiometric | $T_{50}$ NOx stoichiometric |
|---|---|---|---|
| VGPF2 | 368 | 374 | 371 |
| VGPF3 | 387 | 395 | 396 |
| GPF3 | 323 | 325 | 319 |

The dynamic conversion behavior of the particulate filters was determined in a lambda sweep test in a range from $\lambda$=0.99-1.01 at a constant temperature of 510° C. The amplitude of $\lambda$ in this case amounted to ±3.4%. Table 4 shows the conversion at the intersection of the CO and NOx conversion curves, along with the associated HC conversion of the aged particulate filters.

TABLE 4

|  | CO/NOx conversion at the point of intersection | HC conversion at λ of the CO/NOx point of intersection |
| --- | --- | --- |
| VGPF2 | 92 | 97 |
| VGPF3 | 93 | 97 |
| GPF3 | 97 | 98 |

The particulate filter GPF3 according to the invention shows a marked improvement in light-off behavior and dynamic CO/NOx conversion in the aged state compared with VGPF2 and VGPF3.

COMPARATIVE EXAMPLE 4

Coating the Input Channels a) Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate in the input channels to a length of 50% of the filter length. The load of the inlet channel amounted to 100 g/l; the noble metal load amounted to 1.42 g/l with a ratio of palladium to rhodium of 5:1. The coated filter thus obtained was dried and then calcined.

Coating the Output Channels b) Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the output channels to a length of 50% of the filter length. The load of the outlet channel amounted to 100 g/l; the noble metal load amounted to 1.42 g/l with a ratio of palladium to rhodium of 5:1. The coated filter thus obtained was dried and then calcined. The total load of this filter thus amounted to 100 g/l; the total noble metal load amounted to 1.42 g/l with a ratio of palladium to rhodium of 5:1. It is hereinafter referred to as VGPF4.

EXAMPLE 4

Coating the Input Channels a) Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate in the input channels to a length of 55% of the filter length. The load of the inlet channel amounted to 91 g/l; the noble metal load amounted to 1.16 g/l with a ratio of palladium to rhodium of 5:1. The coated filter thus obtained was dried and then calcined.

Coating the Output Channels b) Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the output channels to a length of 55% of the filter length. The load of the outlet channel amounted to 91 g/l; the noble metal load amounted to 1.16 g/l with a ratio of palladium to rhodium of 5:1. The coated filter thus obtained was dried and then calcined. The total load of this filter thus amounted to 100 g/l; the total noble metal load amounted to 1.42 g/l with a ratio of palladium to rhodium of 5:1. It is hereinafter referred to as GPF3.

EXAMPLE 5

Coating the Input Channels a) Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate in the input channels to a length of 60% of the filter length. The load of the inlet channel amounted to 83.33 g/l; the noble metal load amounted to 1.06 g/l with a ratio of palladium to rhodium of 5:1. The coated filter thus obtained was dried and then calcined.

Coating the Output Channels b) Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the output channels to a length of 60% of the filter length. The load of the outlet channel amounted to 83.33 g/l; the noble metal load amounted to 1.06 g/l with a ratio of palladium to rhodium of 5:1. The coated filter thus obtained was dried and then calcined. The total load of this filter thus amounted to 100 g/l; the total noble metal load amounted to 1.42 g/l with a ratio of palladium to rhodium of 5:1. It is hereinafter referred to as GPF4.

EXAMPLE 6

Coating the Input Channels a) Aluminum oxide stabilized with lanthanum oxide was suspended in water with an oxygen storage component, which comprised 24% by weight cerium oxide, zirconium oxide, lanthanum oxide and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall-flow filter substrate. The coating suspension was coated onto the filter walls of the substrate in the input channels to a length of 80% of the filter length. The load of the inlet channel amounted to 62.5 g/l; the noble metal load amounted to 0.79 g/l with a ratio of palladium to rhodium of 5:1. The coated filter thus obtained was dried and then calcined.

Coating the Output Channels b) Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall-flow filter substrate obtained under a), wherein the filter walls of the substrate were coated in the output channels to a length of 80% of the filter length. The load of the outlet channel amounted to 62.5 g/l; the noble metal load amounted to 0.79 with a ratio of palladium to rhodium of 5:1. The coated filter thus obtained was dried and then calcined. The total load of this filter thus amounted to 100 g/l; the total noble metal load amounted to 1.42 with a ratio of palladium to rhodium of 5:1. It is hereinafter referred to as GPF5.

Catalytic Characterization

The particulate filters VGPF4, GPF4, GPF5 and GPF6 were compared at a cold blow test bench with respect to the exhaust back pressure.

Table 5 below shows pressure loss data which were determined at an air temperature of 21° C. and a volume flow rate of 600 m3/h. The values were normalized to VGPF4 for better clarity.

TABLE 5

|  | VGPF4 | GPF4 | GPF5 | GPF6 |
|---|---|---|---|---|
| Δp normalized to VGPF3 | 100 | 92 | 78 | 70 |

The filters GPF4, GPF5 and GPF6 according to the invention all surprisingly have a lower pressure loss than the comparative example VGPF4, even though they cover a larger surface of the filter walls. This is quite surprising since it could actually be assumed that longer coatings cause a higher exhaust back pressure, since here more exhaust gas must flow through the catalytic coatings, since as a result less exhaust gas can flow through the filter wall that is not provided with a coating.

It was furthermore systematically investigated what the main effects responsible for the lowest possible exhaust back pressure are. In doing so, various filters with different zone lengths (factor A) and washcoat layer thicknesses (factor B) were prepared and compared with one another. All filters had the same total washcoat load and the same noble metal content.

TABLE 6

| Factor | Name | Unit | Min | Max |
|---|---|---|---|---|
| A | Zone length | % | 30 | 60 |
| B | Washcoat thickness | g/l | 50 | 80 |

Figure 2:
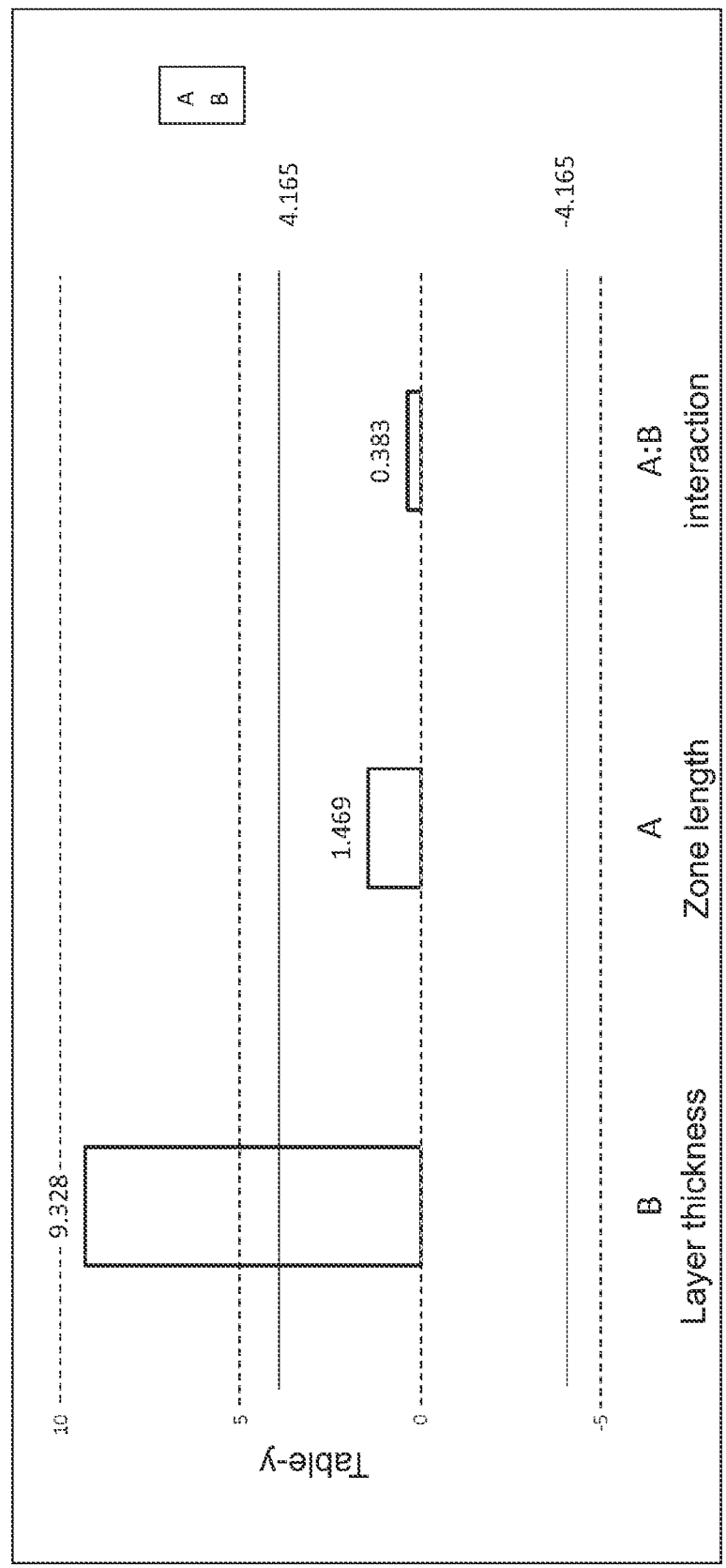
FIG. 2 shows a backpressure versus coating type characteristics analysis.

The statistical evaluation shows that it is particularly advantageous to distribute the washcoat on as large a surface as possible on the filter walls with a resultant low layer thickness, instead of covering only a small surface with a high layer thickness, since a high layer thickness is to be regarded as the main cause of a high exhaust back pressure (FIG. 2). In addition, the particulate filters were aged together in an engine test bench aging process. This aging process consists of an overrun cut-off aging process with an exhaust gas temperature of 950° C. before the catalyst input (maximum bed temperature of 1030° C.). The aging time was 19 hours (see Motortechnische Zeitschrift, 1994, 55, 214-218).

Figure 3:
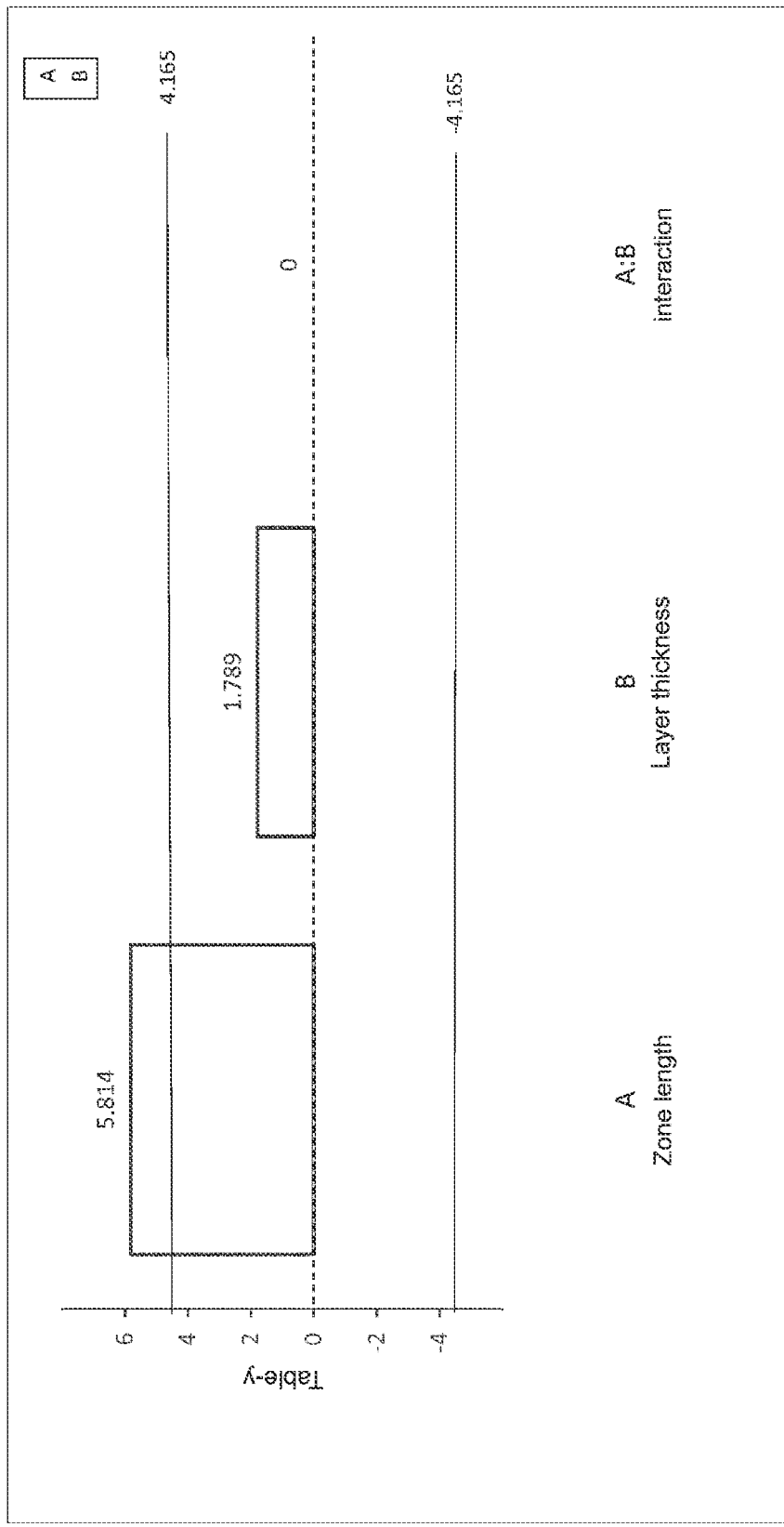
FIG. 3 shows a lambda sweep for different coating type characteristics analysis.

The catalytically active particulate filters were then tested in the aged state at an engine test bench in the so-called "lambda sweep test" Surprisingly, the statistical evaluation of the test results also shows a significant advantage in the lambda sweep test if the catalytic coating is applied with a low layer thickness to as large a surface as possible (FIG. 3).

In addition, it was investigated to what extent an embodiment consisting of one short and one long zone differs from an embodiment consisting of two long zones. For this purpose, a filter according to the invention with zone lengths of 60% of the filter length in each case was compared with a comparison filter with zone lengths of 90% in the inlet channel and 30% in the outlet channel. In the light-off test, in which the light-off behavior in the case of a stoichiometric exhaust gas composition with a constant average air ratio λ is determined (λ=0.999 with ±3.4% amplitude), it is found that the filter according to the invention with zones lengths of 60% in each case can convert the corresponding exhaust gas components at lower temperatures than the filter not according to the invention with zone lengths of 90% and 30%. Table 7 below contains the temperatures $T_{50}$ at which 50% of the considered components are respectively converted.

TABLE 7

| Zone length | $T_{50}$ HC stoichiometric | $T_{50}$ CO stoichiometric | $T_{50}$ NOx stoichiometric |
|---|---|---|---|
| 90:30 | 288 | 287 | 288 |
| 60:60 | 284 | 284 | 284 |

The invention claimed is:
1. Particulate filter for removing particles, carbon monoxide, hydrocarbons and nitrogen oxides from the exhaust gas of combustion engines fueled by stoichiometric air-fuel mixtures, which filter comprises a wall-flow filter of length

L and two coatings Y and Z, wherein the wall-flow filter comprises channels E and A that extend in parallel between a first and a second end of the wall-flow filter and are separated by porous walls which form the surfaces $O_E$ and $O_A$, respectively, and wherein the channels E are closed at the second end and the channels A are closed at the first end, and wherein the coatings Y and Z comprise the same oxygen storage components and the same carrier materials for noble metals, wherein coating Y is located in the channels E on the surfaces $O_E$ and extends from the first end of the wall-flow filter over a length of 51 to 90% of the length L, and coating Z is located in the channels A on the surfaces $O_A$ and extends from the second end of the wall-flow filter over a length of 51 to 90% of the length L, and wherein the coatings Y and Z have a thickness between 5-250 μm.

2. Particulate filter in accordance with claim 1, wherein the coating Y extends from the first end of the wall-flow filter over 57 to 65% of the length L of the wall-flow filter.

3. Particulate filter in accordance with claim 1, wherein the coating Z extends from the second end of the wall-flow filter over 57 to 65% of the length L of the wall-flow filter.

4. Particulate filter in accordance with claim 1, wherein each of the coatings Y and Z contains one or more noble metals fixed to one or more carrier materials, and one or more oxygen storage components.

5. Particulate filter in accordance with claim 4, wherein each of the coatings Y and Z contains the noble metals platinum, palladium and/or rhodium.

6. Particulate filter in accordance with claim 4, wherein each of the coatings Y and Z contains the noble metals palladium, rhodium or palladium and rhodium.

7. Particulate filter in accordance with claim 4, wherein the carrier materials for the noble metals are metal oxides with a BET surface area of 30 to 250 $m^2/g$ (determined according to DIN 66132).

8. Particulate filter in accordance with claim 4, wherein the carrier materials for the noble metals are selected from the group consisting of aluminum oxide, doped aluminum oxide, silicon oxide, titanium dioxide and mixed oxides of one or more thereof.

9. Particulate filter in accordance with claim 4, wherein the coatings Y and Z contain cerium/zirconium/rare-earth metal mixed oxides as oxygen storage components.

10. Particulate filter in accordance with claim 9, wherein the cerium/zirconium/rare-earth metal mixed oxides contain lanthanum oxide, yttrium oxide, praseodymium oxide, neodymium oxide and/or samarium oxide as rare-earth metal oxide.

11. Particulate filter in accordance with claim 9, wherein the cerium/zirconium/rare-earth metal mixed oxides contain lanthanum oxide and yttrium oxide, yttrium oxide and praseodymium oxide or lanthanum oxide and praseodymium oxide as rare-earth metal oxide.

12. Particulate filter in accordance with claim 1, wherein the coatings Y and Z both comprise lanthanum-stabilized aluminum oxide, rhodium, palladium or palladium and rhodium and an oxygen storage component comprising zirconium oxide, cerium oxide, yttrium oxide and lanthanum oxide.

13. Particulate filter in accordance with claim 1, wherein the coatings Y and Z both comprise lanthanum-stabilized aluminum oxide, rhodium, palladium or palladium and rhodium and an oxygen storage component comprising zirconium oxide, cerium oxide, praseodymium oxide and lanthanum oxide.

14. Particulate filter in accordance with claim 1 which comprises a wall-flow filter of length L and two coatings Y and Z having the same composition, wherein the wall-flow filter comprises channels E and A that extend in parallel between a first and a second end of the wall-flow filter and are separated by porous walls which form the surfaces $O_E$ and $O_A$, respectively, and wherein the channels E are closed at the second end and the channels A are closed at the first end, and wherein the coatings Y and Z comprise the same oxygen storage components and the same carrier materials for noble metals, wherein coating Y is located in the channels E on the surfaces $O_E$ and extends from the first end of the wall-flow filter over 57 to 65% of the length L, coating Z is located in the channels A on the surfaces $O_A$ and extends from the second end of the wall-flow filter over 57 to 65% of the length L, and the coatings Y and Z contains aluminum oxide in a quantity from 20 to 70% by weight based on the total weight of the coating Y or Z, rhodium, palladium or palladium and rhodium and an oxygen storage component in a quantity from 30 to 80% by weight based on the total weight of the coating Y or Z, wherein the oxygen storage component comprises zirconium oxide, cerium oxide, lanthanum oxide and yttrium oxide or zirconium oxide, cerium oxide, lanthanum oxide and praseodymium oxide or a mixture of two oxygen storage components, wherein one oxygen storage component contains zirconium oxide, cerium oxide, lanthanum oxide and yttrium oxide and the other contains zirconium oxide, cerium oxide, lanthanum oxide and praseodymium oxide.

15. Method for removing particles, carbon monoxide, hydrocarbons, and nitrogen oxides from the exhaust gas of combustion engines fueled by a stoichiometric air-fuel mixture, wherein the exhaust gas is conducted through a particulate filter in accordance with claim 1.

* * * * *